July 22, 1958

J. B. DOW 2,844,758

METHOD OF MAKING MULTICOLOR CATHODE-RAY TUBE SCREENS

Filed Aug. 30, 1954

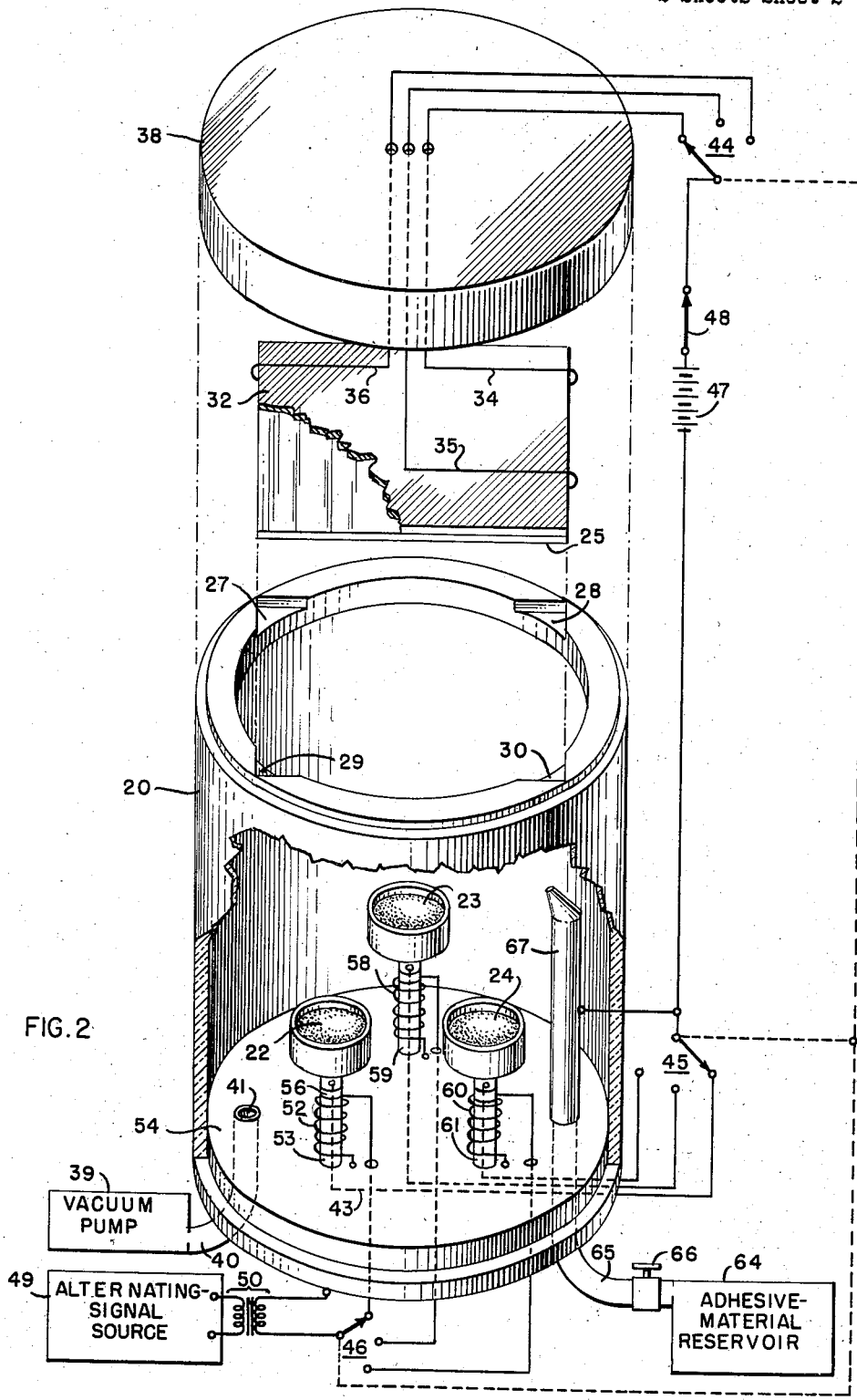

United States Patent Office 2,844,758
Patented July 22, 1958

2,844,758

METHOD OF MAKING MULTICOLOR
CATHODE-RAY TUBE SCREENS

Jennings B. Dow, Jamaica, N. Y., assignor to Hazeltine
Research, Inc., Chicago, Ill., a corporation of Illinois Application August 30, 1954, Serial No. 453,053

13 Claims. (Cl. 315—21)

This invention relates to a method of making multicolor cathode-ray tube screens and particularly to such methods useful in producing the three-color phosphor screens of present-day color-television picture tubes.

In the production of present-day color-television picture tubes, it is conventional practice to deposit red, green, and blue phosphor on the phosphor plate of the tube in either dot- or parallel-line patterns. The phosphors have heretofore been deposited by either a screening or a settling process. The screening process utilizes a stencil pattern through which a phosphor paste is squeegeed. Each color phosphor is applied individually and the stencil is cleaned between application of different phosphors.

In the settling process one of the color phosphors is allowed to settle over the entire phosphor plate from an aqueous suspension. After settling, a suitable photosensitive material is coated over the phosphor and the surface is then exposed to a light source through a suitable stencil pattern. After exposure, the phosphor plate is processed so that the phosphor in the unexposed areas is washed away completely. The other color phosphors are deposited in a similar manner. Both the screening and the settling processes are slow, costly, and more cumbersome than is generally desirable.

A mask with suitable apertures or color-control grids is usually also mounted within the color-television picture tube in close proximity to the phosphor plate to direct an electron beam or beams to the proper phosphors in the proper manner to produce a color picture. One of the problems faced in the production of color-television picture tubes is to position very precisely the phosphor patterns with respect to such apertures or grid. The problem is complicated by the extremely small sizes and spacings of the apertures or grid wires and the elements of the phosphor patterns.

It is an object of the invention, therefore, to provide a new and improved method for making multi-color cathode-ray tube screens which avoids one or more of the limitations of methods heretofore proposed.

It is another object of the invention to provide a new and improved method for making a multi-color cathode-ray tube screen which rapidly and efficiently enables a plurality of different color phosphor patterns to be deposited on the cathode-ray tube screen to form a composite multicolor pattern suitable for reproducing multicolor television images.

It is a further object of the invention to provide a new and improved method for making a multicolor cathode-ray tube screen which enables the different color phosphor patterns to be efficiently and accurately positioned with respect to the color-control grid of the tube.

In accordance with the invention, the method of making multicolor cathode-ray tube screens comprises positioning a conductor pattern for each of a plurality of colors in an evacuated atmosphere adjacent a plate in such a manner as to resemble the desired phosphor patterns, individually and successively admitting and agitating phosphors corresponding to the aforesaid colors to the region adjacent the above-mentioned plate, and selectively imposing a potential on individual conductor patterns during an admission of corresponding phosphors successively to attract the phosphors to the plate in registry with the corresponding conductor patterns.

For a better understanding of the present invention, together with other and further objects thereof, reference is had to the following description taken in connection with the accompanying drawings, and its scope will be pointed out in the appended claims.

Referring to the drawings:

Fig. 2 is a partly sectional and partly exploded perspective view of apparatus useful in practicing the present invention;

Figure 1:
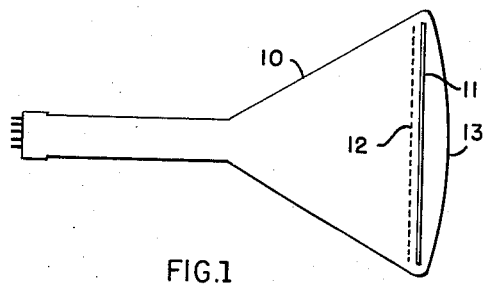
Fig. 1 is a diagrammatic view of a typical color-television picture tube.

Referring to Fig. 1 of the drawings, there is represented a typical color-television picture tube 10 having a phosphor plate 11 bearing the phosphor patterns, a mask 12 mounted directly behind the phosphor plate 11, and a transparent face plate 13 sealing the viewing end of the tube. As in a conventional type of tube, the mask 12 may have a multitude of small apertures for directing one or more electron beams to the proper phosphor dot patterns on the plate 11 as the color image is developed by a conventional scanning process. Instead of small apertures, and as in another conventional type of tube, the mask 12 may consist of a multitude of closely spaced parallel grid wires for controlling the electron beam during the scanning process by directing it to selected ones of parallel phosphor strips on the plate 11. In some tubes, the phosphor plate 11 is separate from the face plate 13 of the tube, while in other tubes, the phosphor patterns are deposited directly on the inner surface of the face plate 13.

In order to deposit the phosphor patterns on, for example, the phosphor plate 11 of Fig. 1 in accordance with the present invention, use may be made of a chamber 20 as shown in Fig. 2 and having located therein receptacles 22, 23, and 24, for holding the desired color phosphor materials to be deposited on the phosphor plate. For example, a quantity of finely divided green phosphor powder is placed in receptacle 22, while a quantity of finely divided red phosphor powder is placed in receptacle 23, and a quantity of finely divided blue phosphor powder is placed in receptacle 24. The longitudinal wall of the chamber 20 is made of electrical insulating material such as glass.

Figure 3:
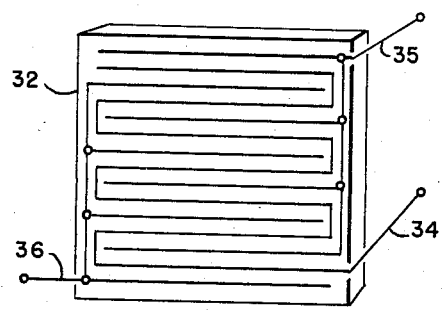
Fig. 3 is a plan view of a representative electrode pattern suitable for use with the apparatus of Fig. 2, and Figs. 4–6, inclusive, are cross-sectional views of representative electrode and phosphor patterns for the phosphor screen of a cathode-ray tube.

A phosphor plate 25 upon which the phosphors are to be deposited and corresponding, for example, to plate 11 of the Fig. 1 picture tube, is placed in the supporting notches 27–30, inclusive, of the chamber 20. The phosphor plate 25 may be a thin plate of any suitable transparent electrical insulator material, for example, glass. An electrode pattern for each color is then positioned adjacent the phosphor plate 25. The electrode pattern may comprise, for example, three sets of parallel-line conductor patterns with the lines of each set interleaved with those of the other sets and affixed to a supporting plate 32 as shown in more detail in Fig. 3. The supporting plate 32 may be a thin plate of glass or any other suitable insulating material. The parallel-line electrode patterns comprise conductors affixed to the supporting plate 32 by means of a suitable binding material or printed thereon by any of the well-known circuit printing techniques. The green electrode pattern is indicated, for example, by the conductive pattern 34, the red pattern by pattern 35, and the blue pattern by pattern 36. It is to be understood that the invention is not limited to depositing parallel-line phosphor patterns and other configurations of phosphor patterns may be deposited by using suitable electrode patterns.

It is desirable in most cases to carry out the phosphor-depositing process in an evacuated or partially evacuated region in order to reduce ionization of contained gases and also to reduce collisions of phosphor particles with gas molecules. To this end, after the supporting plate 32 is properly positioned in the notches 27–30, inclusive, a lid or top piece 38 is placed on top of the chamber 20 to seal off the chamber from the exterior atmosphere. The chamber 20 is then evacuated by means of a vacuum pump 39 attached, for example, through a hose 40 to an outlet 41 located in the base of the chamber 20 to reduce ionization of contained gases and also to reduce collisions of phosphor particles with gas molecules.

Next, potentials are selectively imposed on the electrode patterns 34, 35, and 36 in the presence of a phosphor of corresponding color to attract the phosphor to the phosphor plate 25 in registry with the electrode pattern. To this end, a trio of ganged switches 44, 45, and 46 are switched to a position such that a source of high potential illustrated by battery 47 is connected between, for example, the green electrode pattern 34 via switch 44, and the green phosphor receptacle 22 via switch 45 and a conductor 43 attached to receptacle 22. At the same time, an alternating current is supplied from an alternating-signal source 49 through a transformer 50 and the switch 46 to a coil 52 suitably wrapped around a supporting shaft 53 of magnetostrictive material to which the green phosphor receptacle 22 is attached. At one end, the supporting shaft 53 is firmly attached to the metal base plate 54 of the chamber 20 and at the other end is attached through a piece of electrical insulating material 56 to the green phosphor receptacle 22.

The alternating signal supplied to the coil 52 is effective by means of magnetostrictive action within the shaft 53 to cause the shaft to vibrate longitudinally thereby vibrating the green phosphor receptacle 22 to cause some of the green phosphor material to be ejected a short distance into the region above the receptacle. Because the green electrode pattern 34 is at a high potential with respect to the green phosphor receptacle 22, the finely divided green phosphor particles in the region above the receptacle 22 are attracted towards the green electrode pattern 34. The green phosphor particles, however, never reach the electrode pattern but instead are deposited on the intermediate phosphor plate 25. Because the electrostatic force pattern extending from the green electrode pattern is shaped in accordance with the electrode pattern, the green phosphors are deposited on the phosphor plate 25 in line with or in registry with the electrode pattern 34.

In the same manner, red phosphor particles from the red phosphor receptacle 23 are deposited on the phosphor plate 25 in registry with the red electrode pattern 35 when the switches 44, 45, and 46 are set so that the source of potential represented by battery 47 is connected between the red electrode pattern 35 and the red phosphor receptacle 23. At this time, alternating-signal energy from the source 49 is applied only to a coil 58 wrapped around the magnetostrictive supporting shaft 59 on the red phosphor receptacle 23 so that only this receptacle is vibrating. Blue phosphor particles are likewise deposited on the phosphor plate 25 in registry with the blue electrode pattern 36 when the switches are set so that the battery 47 is connected between the blue electrode pattern 36 and the blue phosphor receptacle 24. The blue phosphor receptacle 24 is similarly vibrated by the magnetostrictive action of the alternating signal supplied to a coil 60 which is wrapped around the magnetostrictive supporting shaft 61 of the blue phosphor receptacle 24.

After the desired phosphor patterns have been deposited on the plate 25 to which they adhere as more fully explained subsequently, the plate 25 may be removed from the chamber 20 and heat treated or baked in a conventional manner. The finished plates may then be installed in a color-television picture tube in a manner similar to that of the phosphor plate 11 of the representative picture tube 10 of Fig. 1.

There are various ways in which the phosphors may be introduced into the chamber 20 and the method of placing the phosphor in vibrating receptacles as shown in Fig. 2 is intended for illustrative purposes only. The phosphor materials could, for example, be admitted into the chamber 20 by individually injecting each phosphor through a separate nozzle projecting through the base plate 54 of the chamber 20 in a manner similar to that of nozzle 67 which will be mentioned more fully hereinafter. In this manner, each phosphor material is individually sprayed into the chamber 20 when its corresponding electrode pattern is energized by the battery 47.

Depending upon the nature of the phosphor materials used and the magnitude of the potential supplied by the source represented by battery 47, it may be desirable in apparatus constructed in accordance with that of Fig. 2 to place a rotatable shielding plate having a suitable opening therein immediately above the phosphor receptacles 22, 23, and 24 so that when, for example, the green electrode pattern is energized only the contents of the green receptacle 22 will be exposed to the resulting electrostatic field.

It may also be desirable, depending upon the nature of the phosphor particles and the nature of the surface on which they are to be deposited, to coat the phosphor plate with an adhesive material to facilitate affixing the phosphors to the plate. For some materials, however, sufficient adhesion may be obtained between the phosphors and plate without the use of such adhesive material, in which case the phosphors may be permanently bonded to the plate by heat treating the plate in a conventional manner after all the desired phosphors have been deposited. Fig. 2 shows an adhesive material reservoir 64 coupled through hose 65, and a petcock 66 to a nozzle 67 opening into the interior of the chamber 20. In this manner, the adhesive material is admitted through the nozzle 67 and electrostatically attracted to the electrode patterns either at the same time as are the phosphors or shortly before the phosphors are deposited on the plate. For some types of adhesive material, it may be desirable to introduce two or more of the constituents of the adhesive material through separate nozzles to more effectively deposit the adhesive surface of the phosphor plate 25.

Figure 4:
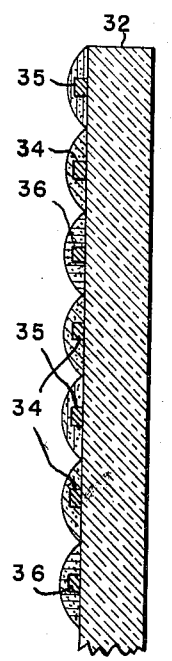

As shown in Fig. 2, the electrode patterns are initially affixed to one plate 32, while the phosphors are deposited on a second plate 25. Advantageous results may be obtained, however, by eliminating the separate phosphor plate 25 and depositing the phosphors directly upon the corresponding electrode conductor patterns of the supporting plate 32, in which case the supporting plate becomes the phosphor plate. A cross section of such a plate with the phosphors properly deposited thereon is shown in Fig. 4. The green phosphor is deposited or superimposed by electrostatic attraction upon and adjacent to the green electrode conductors 34, the red phosphor similarly about the red electrode conductors 35, and the blue phosphor similarly about the blue electrode conductors 36. By depositing the phosphors in this manner, each phosphor is automatically, accurately, and permanently positioned with respect to its corresponding electrode conductor pattern and some or all of these conductor patterns may be used to perform the same function as performed by the color-control grid 12 of the picture tube shown in Fig. 1, namely, to direct the electron beam or beams to the phosphors of the proper color during the scanning process to develop the desired color image. This method of producing the phosphor plate is not only relatively simple and speedy, it also has the special merit of completely avoiding the current problem of registry or alignment between the grid wires of mask 12 (Fig. 1) and the phosphors, since the phosphors are automatically and accurately aligned with respect to the color-control grid. Moreover, there is no tendency for the grid wires to vibrate in an undesirable manner because they are firmly attached to the phosphor plate 32.

In order to insure that the grid wires attached to the phosphor plate in this manner will not cause noticeable shadows or dark streaks in the reproduced image when viewed from the side of the plate on which the grid wires are not attached, the grid wires should be of small width or diameter compared to the width of the individual strips of phosphor deposit. In this regard, the width of the grid wire conductor may be, for example, about one-fifth the width of the phosphor deposit as shown in Fig. 4. Or, if preferred, the phosphor plate with attached grid and phosphor patterns may be used in a picture tube where the phosphors are viewed from the same side on which they are struck by the electron beam, the electron beam approaching the phosphor plate at an angle, for example, of 45 degrees.

Figure 5:
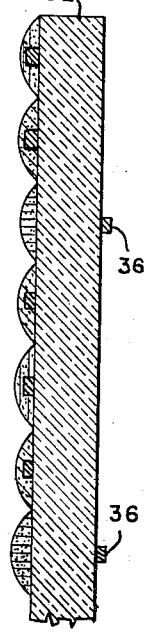

Instead of affixing all the conductor patterns to one side of the phosphor plate 32 as shown in Fig. 4, it may be desirable to affix the conductor pattern to opposite sides of the phosphor plate 32 as shown in Fig. 5. The phosphors may still be deposited on a single side of the phosphor plate 32 as indicated. This arrangement may be desirable to simplify the procedure of attaching the electrode patterns to the phosphor plate.

Figure 6:
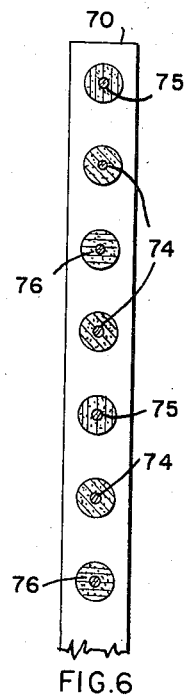

For some purposes, it may also be desirable to eliminate the phosphor plate 32 altogether and deposit the phosphors directly on sets of horizontal grid wires strung between the side members of a supporting frame 70 as shown in Fig. 6 in which case the grid wires or electrode patterns become the phosphor supporting body. For either of these modifications, the width or diameter of the grid wire conductors should be small compared to the width or diameter of the phosphor deposit or the excited phosphors should be viewed from the same side on which they are struck by the electron beam as mentioned in connection with the Fig. 4 phosphor plate pattern.

From the foregoing description of the invention it will be apparent that the method of making multicolor cathode-ray tube screens of the present invention represents a rapid and efficient method of producing accurately spaced and positioned multicolor phosphor patterns on these screens which requires no intermediate steps between depositing of the different color phosphors.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. The method of making multicolor cathode-ray tube screens which comprises: positioning a conductor pattern for each of a plurality of colors in an evacuated atmosphere adjacent a plate in such a manner as to resemble the desired phosphor patterns; individually and successively admitting and agitating phosphors corresponding to said colors to a region adjacent said plate; and selectively imposing a potential on individual conductor patterns during admission of corresponding phosphors successively to attract said phosphors to said plate in registry with the corresponding conductor patterns.

2. The method of making multicolor cathode-ray tube screens which comprises: affixing a parallel-line conductor pattern for each of a plurality of colors to a plate with the patterns interleaved in such a manner as to form a composite control-grid structure for the cathode-ray tube; placing said plate in a region of evacuated atmosphere; individually and successively admitting and agitating phosphors corresponding to said colors to said region adjacent said plate; and selectively imposing potentials on individual conductor patterns during admissions of corresponding phosphors successively to attract said phosphors to said plate in registry with the corresponding conductor patterns and superimposed thereon.

3. A method of making multicolor cathode-ray tube screens, the method comprising: positioning a plurality of independent but interleaved conductor patterns adjacent a plate of nonconductive material; agitating sources of color phosphor powders; connecting a source of high potential between only a first of the conductor patterns and a first source of color phosphor powder to attract the color phosphor powder to the nonconductive plate in registry with the conductor pattern; and successively shifting the connection of the high-potential source so as, in a like manner, to successively connect it between each of the remaining conductor patterns and their corresponding phosphor powder sources which introduce phosphor powders of different colors which are successively attracted to the nonconductive plate in registry with the corresponding conductor patterns, thereby to develop a multicolor phosphor pattern on the nonconductive plate.

4. A method of making multicolor cathode-ray tube screens, the method comprising: placing a plate of nonconductive material in an enclosed chamber; positioning a plurality of independent but interleaved conductor patterns adjacent the nonconductive plate; evacuating the chamber; magnetostrictively agitating sources of color phosphor powders; admitting adhesive material to said chamber to a region adjacent said plate; connecting a source of high potential between only a first of the conductor patterns and a first source of color phosphor powder to attract the color phosphor powder and the adhesive material to the nonconductive plate in registry with the conductor pattern; and successively shifting the connection of the high-potential source so as, in a like manner, to successively connect it between each of the remaining conductor patterns and their corresponding phosphor powder sources which introduce phosphor powders of different colors which are successively attracted with the adhesive material to the nonconductive plate in registry with the corresponding conductor patterns, thereby to develop a multicolor phosphor pattern on the nonconductive plate.

5. A method of making multicolor cathode-ray tube screens of the type having a parallel-line phosphor pattern, the method comprising: positioning a plurality of independent but interleaved parallel-line conductor patterns adjacent a plate of nonconductive material; agitating sources of color phosphor powders; connecting a source of high potential between only a first of the conductor patterns and a first source of color phosphor powder to attract the color phosphor powder to the nonconductive plate in registry with the conductor pattern; and successively shifting the connection of the high-potential source so as, in a like manner, to successively connect it between each of the remaining conductor patterns and their corresponding phosphor powder sources which introduce phosphor powders of different colors which are successively attracted to the nonconductive plate in registry with the corresponding conductor patterns, thereby to develop a multicolor parallel-line phosphor pattern on the nonconductive plate.

6. A method of making multicolor cathode-ray tube screens of the type having a parallel-line phosphor pattern, the method comprising: affixing a plurality of independent but interleaved parallel-line conductor patterns to a transparent plate; agitating sources of color phosphor powders; connecting a source of high potential between only a first of the conductor patterns and a first source of color phosphor powder to attract the color phosphor powder to the transparent plate in registry with the conductor pattern and superimposed thereon; and successively shifting the connection of the high-potential source so as, in a like manner, to successively connect it between each of the remaining conductor patterns and their corresponding phosphor powder sources which introduce phosphor powders of different colors which are successively attracted to the transparent plate in registry with and superimposed on the corresponding conductor patterns, thereby to develop a multicolor parallel-line phosphor pattern on the transparent plate.

7. A method of making multicolor cathode-ray tube screens of the type having a parallel-line phosphor pattern composed of interleaved red, green, and blue phosphor lines, the method comprising: placing a transparent plate in a chamber; positioning a trio of independent but interleaved red, green, and blue parallel-line conductor patterns immediately adjacent the back surface of the transparent plate; closing the chamber; evacuating the chamber; agitating red, green, and blue sources of color phosphor powders; connecting a source of high potential between the red conductor pattern and a source of red phosphor powder; enabling the source of red phosphor powder to admit the red phosphor powder to the region adjacent the front surface of the transparent plate, whereby the red phosphor powder is attracted to the front surface of the transparent plate in registry with the red conductor pattern adjacent the back surface thereof; and successively shifting the connection of the high-potential source so as to repeat the last two steps for each of the remaining green and blue conductor patterns and their corresponding green and blue phosphor powder sources.

8. A cathode ray image reproducing tube including a source of an electron beam and a fluorescent screen, said screen being comprised of a transparent plate, a plurality of groups of areas of mutually insulated conductive material mounted on said plate, each of said groups being provided with a coating of material capable of emitting light of different colors when excited by said beam, a common electrical connection for each group of areas, one of said conductive areas being arranged in the form of a sinuous line and a group of strips arranged in interlaced relation with said first group.

9. A cathode ray image reproducing tube including a source of an electron beam and a fluorescent screen, said screen being comprised of a transparent plate, a plurality of groups of areas of mutually insulated conductive material mounted on said plate, each of said groups being provided with a coating of material capable of emitting light of different colors when excited by said beam, a common electrical connection for each group of areas, one of said groups of conductive material being comprised of a grid formed of a sinuous line, a comb-like grid of interconnected strips positioned along each side thereof, the strips of said comb-like grids being interposed in the interstices between the convolutions of said sinuous line.

10. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the strips of each group being electrically interconnected, said fluorescent screen comprising a material capable of emitting light of a selected color when excited by said beam, deposited upon the surface of each of said grid groups, the relative number of strips comprising one grid group varying from the number of strips comprising any other group in accordance with the relative degree of emission desired from said groups.

11. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, one of said grid groups being comprised of a sinuous line.

12. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, one of said grid groups being comprised of a sinuous line, a comb-like grid group being positioned in interlaced relation with respect to said sinuous strip.

13. A cathode ray signal translating device including a source of an electron beam and a fluorescent screen enclosed within an envelope having a transparent face plate, a foundation layer of conductive material deposited on the interior surface of said face plate, said foundation layer being comprised of a grid work of strips of said conductive material arranged in mutually insulated groups, the member of each group being electrically interconnected, said fluorescent screen comprising a material capable of emitting light of a selected color when excited by said beam, deposited upon the surface of each of said grid groups, one of said grid groups being comprised of a sinuous strip, a comb-like grid group positioned on either side of said sinuous grid, the strips thereof being interposed in the interstices between the convolutions of said sinuous grid.

References Cited in the file of this patent

UNITED STATES PATENTS

| | | |
|---|---|---|
| 2,446,440 | Swedlund | Aug. 3, 1948 |
| 2,577,368 | Schultz | Dec. 4, 1951 |
| 2,600,579 | Ruedy et al. | June 17, 1952 |
| 2,682,478 | Howse | June 29, 1954 |
| 2,690,979 | Law | Oct. 5, 1954 |
| 2,767,346 | Hoyt | Oct. 16, 1956 |
| 2,784,341 | Huffman | Mar. 5, 1957 |